United States Patent [19]
Campbell

[11] Patent Number: 5,348,209
[45] Date of Patent: Sep. 20, 1994

[54] APPARATUS FOR BRAZING AND INSTALLING HONEYCOMB CORE SEALS

[76] Inventor: James R. Campbell, 31301 Camel Point Dr., South Laguna, Calif. 92677

[21] Appl. No.: 63,037

[22] Filed: Jul. 6, 1993

Related U.S. Application Data

[62] Division of Ser. No. 807,497, Dec. 16, 1991, Pat. No. 5,224,644.

[51] Int. Cl.5 ............................................. B23K 1/20
[52] U.S. Cl. ........................................ 228/43; 228/33
[58] Field of Search ................. 228/33, 41, 43, 181, 228/248

[56] References Cited

U.S. PATENT DOCUMENTS

| | | | |
|---|---|---|---|
| 2,807,074 | 9/1957 | Schroeder | 228/261 |
| 3,046,648 | 7/1962 | Kelly | 228/181 |
| 4,256,255 | 3/1981 | Stevenson | 228/181 X |
| 4,381,590 | 5/1983 | Nonnenmann et al. | 228/248 X |

*Primary Examiner*—Kenneth J. Ramsey
*Attorney, Agent, or Firm*—Thomas P. Mahoney

[57] ABSTRACT

Apparatus for installation of honeycomb core seals in jet engine mounting rings, including spray deposition of brazing alloy in seals and establishment of compressive relationships between seal and ring prior to brazing of seal in ring.

13 Claims, 5 Drawing Sheets

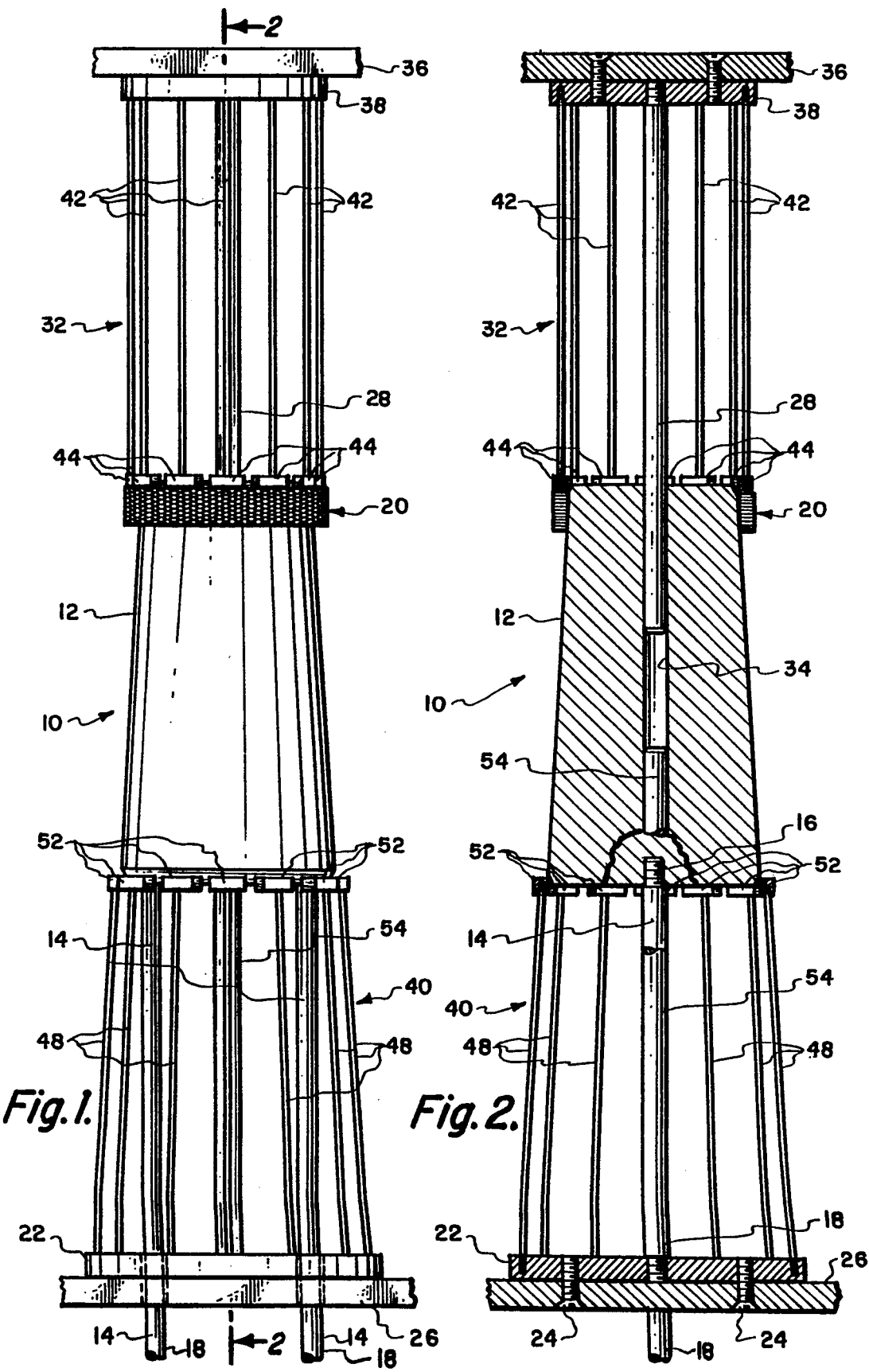

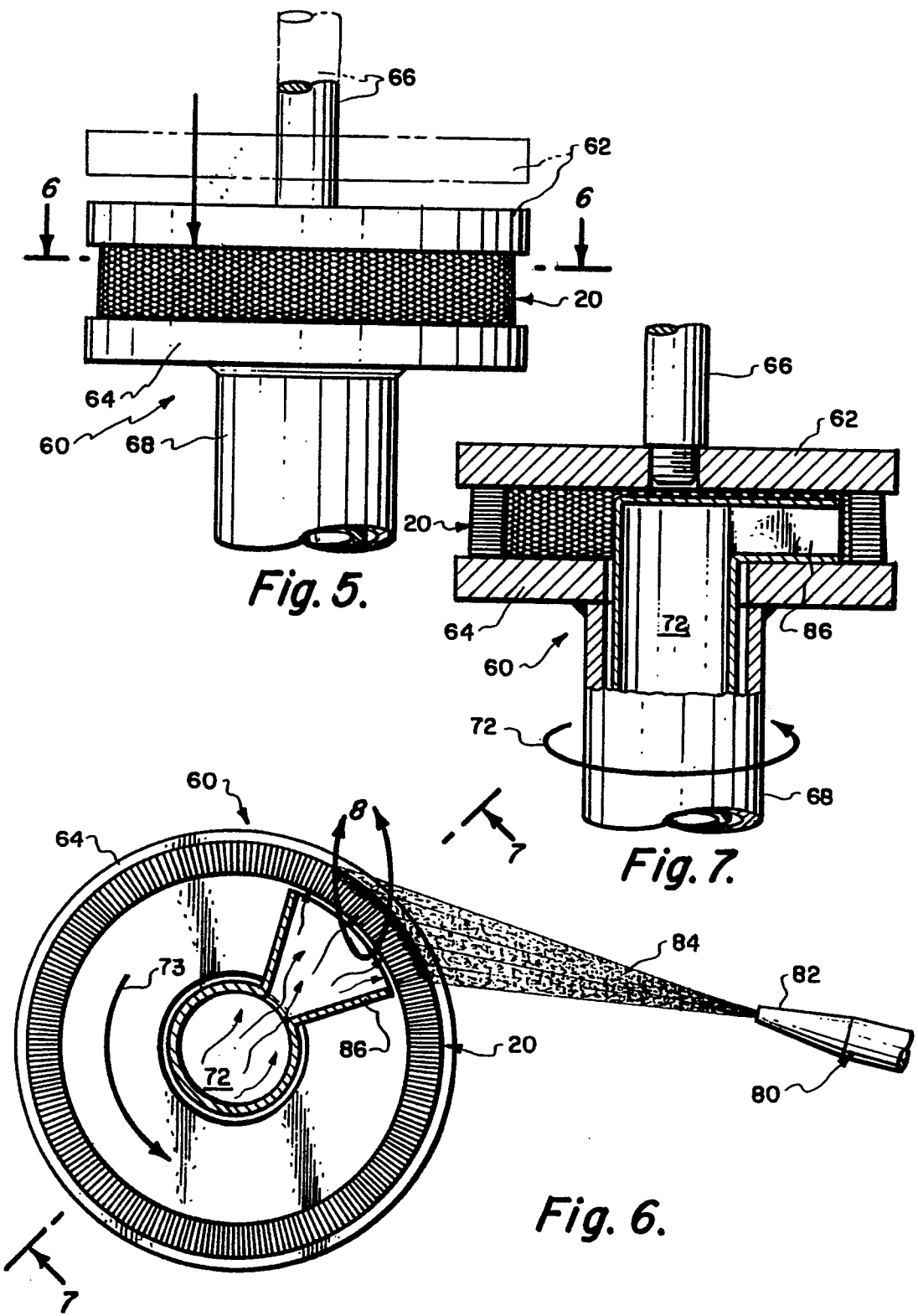

APPARATUS FOR BRAZING AND INSTALLING HONEYCOMB CORE SEALS

This application is a division of application Ser. No. 07/807,497, filed Dec. 16, 1991, now U.S. Pat. No. 5,224,644.

This invention relates to a method and apparatus for the installation of cylindrical honeycomb core seals in associated mounting rings for use in gas turbine engines of the type widely used in jet aircraft and various other industrial applications.

BACKGROUND OF THE INVENTION

It is well known to those skilled in the art that honeycomb core turbine seals fabricated from stainless steel are widely utilized in jet engines and it is also known that one of the major problems encountered in the installation of honeycomb seals in jet engines is the location and securement of said seals within and to the conventional mounting rings which are utilized to install the seals in the jet engine in juxtaposition to the blades of the turbine.

There have been various means and methods proposed and utilized by the prior art to accomplish the desired installation of honeycomb seals in mounting rings. Among them are the use of a welding procedure which is commonly known as "spike welding." This entails the installation of the seal in the mounting ring and the resistance welding of the seal to the adjacent surface of the mounting ring by use of a resistance welding electrode. The problem arising from the utilization of the spike welding method is that it frequently results in damage to seals because of the insertion of the welding electrode into the cells of the honeycomb core.

Due to the damage to the rub surface of the seal resulting from the spike welding method, it is necessary to machine said rub surface to remove dents and burns caused by said method. Obviously, the necessity for such machining subsequently to the spike welding of the core seal to the associated mounting ring entails expensive and time-consuming handling of the seal/mounting ring combination. The best machining of the rub surface is done by electrical discharge machining.

Other methods of affixing the seals in mounting rings include the provision of a resinous tape which carries a brazing alloy, said tape being located at the interface between the seal and the mounting ring before the mounting ring/seal composite is placed in a high-temperature brazing furnace.

The tape is rolled into the OD of the core under considerable pressure. The major disadvantage of the utilization of such tapes is the necessity for the out-gassing of the resinous component of the tape during the brazing process which materially slows the brazing process and also results in the need to exhaust the gasses resulting from the breakdown of the resin carrier to prevent permanent contamination of the inert atmosphere in the brazing furnace. The out-gassing process consumes a considerable amount of time and, thus, materially adds to the cost of the resulting seal composite.

A common method of applying braze alloy powder to the honeycomb core seal is to mix the alloy powder with a resinous vehicle and apply the mixture to the OD of the core seal. The mixture is then allowed to dry prior to the insertion of the seal into the mounting ring.

Once again, the significant cost factor arising out of this process is the necessity for out-gassing the resinous constituents of the vehicle. Furthermore, before the brazing powder can wet to the core seal and mounting ring (which usually takes place after out-gassing), the powder particles can move and, since the assembly is almost always positioned in the furnace with the seal axis vertical, the powder particles can shift downwardly due to gravity and create a thicker bond joint on the bottom edge of the seal.

For further elucidation of the type of seal utilized in gas turbine engines of the character under discussion here, reference is made to U.S. Pat. No. 4,618,152, entitled HONEYCOMB SEAL STRUCTURE, issued Oct. 21, 1986.

Objects and Advantages of The Invention

An object of the invention is the provision of a method and apparatus for installing honeycomb seals in jet engine mounting rings which eliminates the undesirable side effects and expense which accompany prior art methods of installation, such as damage to the seals or the out-gassing characteristic of the utilization of brazing tapes or the like.

An additional object of the invention is the provision of a method of installing a honeycomb seal in its associated mounting ring which includes the steps of locating the seal adjacent a source of brazing alloy and relatively rotating said ring and said source to deposit said alloy in the cells of said seal.

Another object of the invention is the provision of a method for installing honeycomb seals in the mounting rings therefor which includes the step of expanding the seals to cause an interference fit between the OD of said seals and the ID of said rings.

An additional object of my invention is the provision of a method of the aforementioned character which includes the step of momentarily compressing said expanded seal to permit the installation of said seal within the associated mounting ring.

Another object of the invention is the provision of a method of the aforementioned character wherein the brazing alloy is suspended in a gaseous medium which is then sprayed into the cells of said seal.

An additional object of the invention is the provision of an apparatus for deposition of a brazing alloy in a jet engine seal which includes braze alloy applicator means having support means for said seal and a source of brazing alloy, said apparatus including means for causing relative rotation between said support means and said source as said source deposits said brazing alloy in the cells of said seal.

A further object of the invention is the provision of an apparatus of the aforementioned character in which the source of said brazing alloy is constituted by a spray nozzle for spraying gas entrained brazing alloy into the cells of said seal.

An additional object of the invention is the provision of expansion means in said apparatus whereby said seal has its diameter expanded sufficiently to cause an interference fit between its OD and the ID of said mounting ring to achieve compressive engagement between said OD of said seal and said ID of said mounting ring.

Another object of the invention is the provision of a compression means in said apparatus to cause the momentary compression of said ring to facilitate the installation thereof in said mounting ring.

Furthermore, the foil for the seal can be slit to the desired height of the seal 20. Since the method and apparatus of the invention eliminate damage to the rub surface on the ID of the seal, it need not be machined and the rub surface conforms accurately to the OD of the turbine blades.

BRIEF DESCRIPTION OF THE DRAWINGS

Other objects and advantages of the invention will be apparent from the following specification and the accompanying drawings, which are for the purpose of illustration only and in which:

FIG. 1 is a front elevational view of a portion of the apparatus constituted by means for expanding the seal to increase the OD thereof;

FIG. 2 is a vertical sectional view taken on the broken line 2—2 of FIG. 1

FIG. 5 is an elevational view of a portion of the brazing alloy applicator;

FIG. 6 is a transverse sectional view taken on the broken line 6—6 of FIG. 5;

FIG. 7 is a vertical, partly sectional view taken on the broken line 7—7 of FIG. 6;

THE APPARATUS

Figure 13:
FIG. 13 is a schematic view illustrating the relevant core seal with core height and core seal dimensions.

Referring to the drawings, and particularly to FIGS. 1–4, I show a honeycomb core seal expansion means 10 which is adapted to expand the diameter of a honeycomb core seal 20 to cause the OD (outside diameter) thereof, as illustrated in FIG. 13 of the drawings, to be expanded to achieve an interference fit between the OD of said seal and the ID (inside diameter) of the mounting ring 30 for said seal in order that the said seal may be disposed in a compressive relationship with the ID of said mounting ring for a purpose which will be described in greater detail below.

In discussing the various components of the apparatus of the invention, it will be obvious that the teachings of the invention and the method thereof can be achieved by hand manipulation of the various components of the apparatus, but it will be understood by those skilled in the art that the components can be readily integrated into a single apparatus or machine which will automatically perform the various steps of the method without the necessity for manual manipulation of any of the components of the apparatus or machine utilized to practice the teachings of the method.

The expansion means includes a frusto conical mandrel 12 which is supported upon support rods 14 which have their upper extremities 16 threadedly engaged in the lower extremity of the mandrel and their lower extremities 18 extending through a mounting plate 22 which is, in turn, secured by bolts 24 to a base plate 26.

Reciprocatable on the upper extremity of the mandrel 12 is a compression means 32 which is supported by a reciprocating shaft 28 located in a bore 34 provided on the axis of the mandrel 12. The compression means includes a platen 36 which carries a mounting plate 38 having a plurality of elongated fingers 42 secured therein and depending therefrom.

Located at the lower extremities of the fingers are enlarged seal engagement means 44 located to impinge on the upper extremity of a seal 20 which is positioned on the upper end of the frusto conical mandrel 12 prior to the initiation of the expansion process which will be described in detail when the method steps of the invention are disclosed hereinbelow. Positioned below the lower extremity of the mandrel 12, as best shown in FIGS. 1 and 2, is stripper means 40 which includes the mounting plate 22 and support plate 26, said mounting plate 22 having a plurality of fingers 48 having stripper heads 52 secured to the upper extremities thereof and adapted, in a manner to be described in greater detail below, to engage the lower end of the seal 20 to remove the expanded seal from the mandrel 12.

Figures 3, 4:
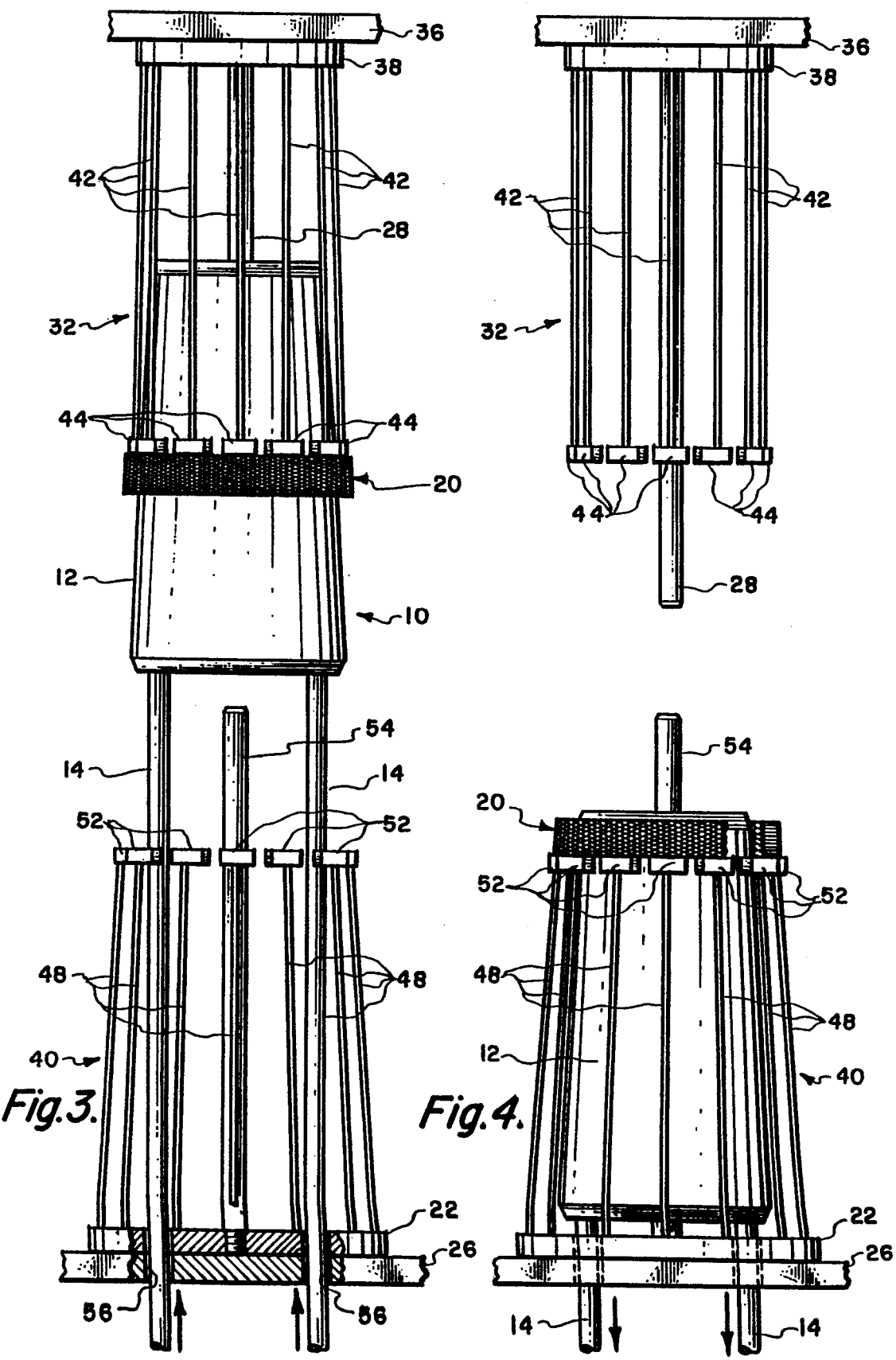
FIG. 3 is a view similar to FIG. 1 showing the expansion process.
FIG. 4 is a view showing the removal of the expanded seal from the expansion means.

As best shown in FIGS. 2 and 3, movement of the stripper means 40 relative to the mandrel 12 is effectuated, in part, by a guide rod 54 which is engaged at its upper extremity in the bore 34 which also receives the reciprocating shaft 28 of the expansion means 32. The support rods 14 have their lower extremities engaged in corresponding bores 56, FIG. 3, in the plates 22 and 26 to permit movement of the stripper relative to the external surface of the mandrel 12.

It will be obvious to those skilled in the art that different-sized mandrels will be provided to accommodate core seals of different ID's. The expansion means can be utilized in a conventional drill press or the equivalent shop tool. Also, it is to be understood that the lower extremities of the support rods 14 are secured to a base place, not shown, which can be supported on the bed of drill press or similar device utilized to cause relative reciprocation between the mandrel 12 and the associated expansion means 32 and stripper means 40.

Applicator means 60, as best shown in FIGS. 5–8 of the drawings, constitutes a component of the apparatus of the invention and achieves the uniform deposition and distribution of brazing alloy in the cells of the core seals 20.

The applicator means 60 includes upper and lower platens 62 and 64, said upper platen being vertically movable on a shaft 66 which is normally spring-biased downwardly to cause said upper platen to be urged in a direction toward the lower platen 64. When the upper platen 62 is raised against the spring bias, a core seal 20 can be inserted between the confronting surfaces of the upper and lower platens 62 and 64 and, when the upper platen 62 moves from the uppermost position shown in FIG. 5, it engages the upper edge of the core seal 20 to maintain said core seal in operative relationship with both platens. Of course, the size of the platens will be determined by the diameter of the core seals which are placed in the applicator means 60 and, if desired, locating shims or other means can be utilized to ensure that the axes of the shaft 66 and the core seal 20 are concentric.

Secured to the underside of the lower platen 64, is a larger shaft 68, said larger shaft being hollow and incorporating a fluid transmission conduit 72 for a purpose which will be described in detail below.

As indicated by the arrow 73, the upper and lower platens 62 and 64 are adapted to be rotated concomitantly by which will be described in detail below.

As indicated by the arrow 73, the upper and lower platens 62 and 64 are adapted to be rotated concomitantly by adjustable drive means, such as a speed-controlled electric motor, to achieve the desirable rate of rotation of the platens 62 and 64 concomitantly with each other.

An inert cooling gas, such as nitrogen or the like, can be conveyed to the core seal 20 through the conduit 72 during the application of the brazing alloy, in a manner to be described in greater detail below.

Figure 8:
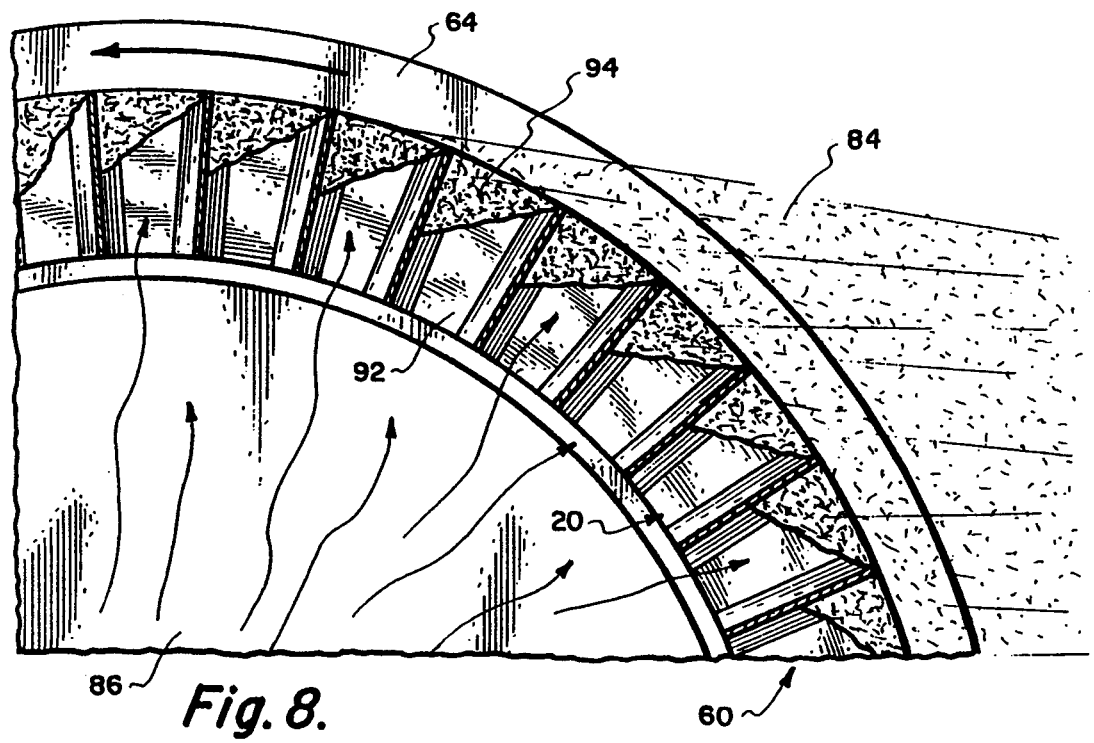
FIG. 8 is an enlarged, fragmentary sectional view taken from the line 8—8 of FIG. 6.

Located adjacent the perimeter of the platens 62 and 64 is an applicator head 80 constituted by a gaseous spray nozzle 82 adapted to propel brazing alloy entrained in a heated gaseous medium to provide a carefully controlled spray 84 which impinges on the perimeter of the core seal 20 in the manner shown in FIGS. 6 and 8 of the drawings.

Connected to the upper extremity of the conduit 72 for cooling gas is a frusto conical outlet 86, as best shown in FIG. 6 of the drawings, said frusto conical outlet being located in the area of the applicator means 60 where the impingement of the braze alloy spray occurs to cause cooling and oxidation prevention and to assist in the uniform application of the braze alloy spray.

It will be noted that, while the platens 62 and 64 rotate, the nozzle 82 is adjusted to move across the width of the seal 20 and, therefore, once the volumetric spray nozzle adjustments have been made and the speed of rotation of the platens 62 and 64 with the core seal 20 has been established, the process can be repeated as additional seals are subjected to the application of the braze alloy spray 84.

The axis of the spray nozzle 82 is disposed in an angular position relative to seal 20 so that braze alloy impinges only on one side of the cells and, preferably, not to the cell bottom, thus causing the deposition of a brazing alloy in the cells 92 of the core seal in the manner shown at 94 in FIG. 8 of the drawings.

As can be readily perceived, the spray 84 deposits the braze alloy in the outer portions of the cells 92 with the core seal 20 and the flow of gas from the frusto conical gas nozzle 86 causes the rapid setting of the braze alloy material.

The heated carrier gas causes the brazing alloy to melt into a liquid phase and, thus, when the deposition of alloy in all of the cells 92 of the core seal 20 is accomplished, the core seal 20 is removed from the applicator means 60.

Figure 9:
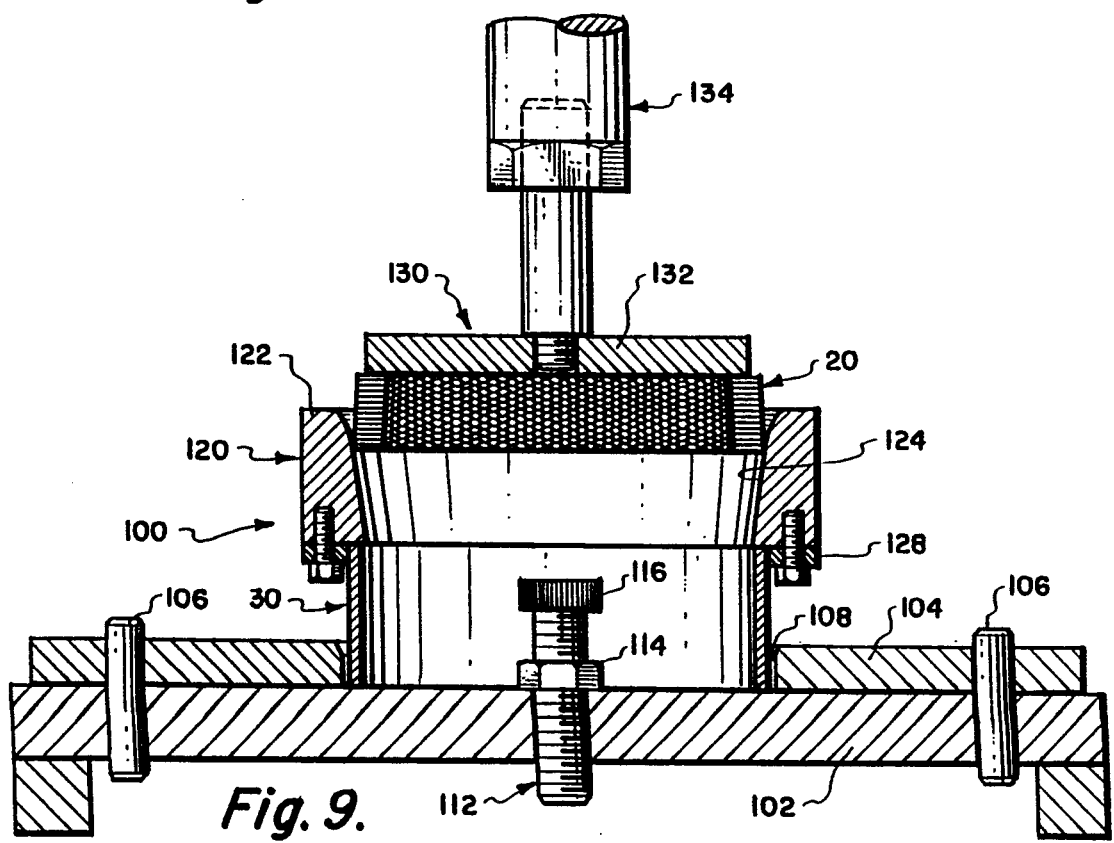
FIG. 9 is a vertical, partly sectional view of the insertion and locating means for inserting and locating a seal in the associated mounting ring.
Figure 10:
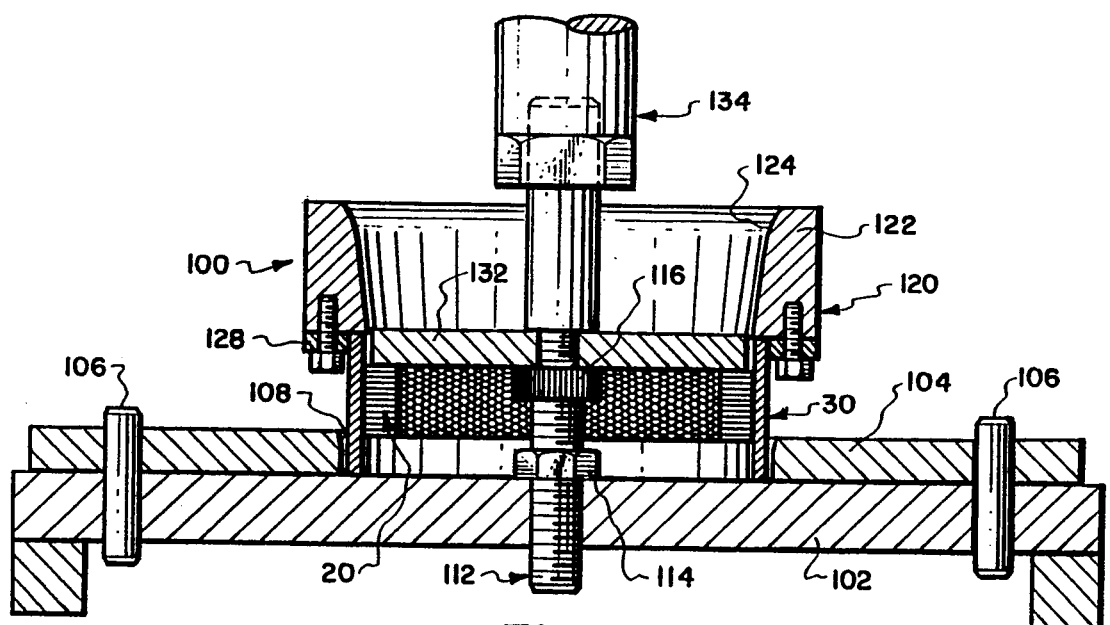
FIG. 10 is a partly sectional, fragmentary view showing the completion of the installation and location of a seal in the associated mounting ring.

The last component of the apparatus is constituted by the core seal installation means 100, best shown in FIGS. 9 and 10 of the drawings. The core seal 20 with the brazing alloy deposited in the cells 92 thereof, indicated as 94 in FIG. 8 of the drawings, has been expanded by expansion means 10 in a manner to be discussed in detail when the method of the invention is described hereinbelow. In other words, the OD of the seal 20 has been expanded so that it is somewhat greater than the ID of the seal ring 30.

The core seal installation means 100 includes a base plate 102 and a locating plate 104 which is positioned on the base plate 102 by locating pins 106. A centrally located circular recess 108 acts as the receptacle for the lower extremity of the seal mounting ring 30.

Obviously, different sizes of seal mounting rings 30 can be accommodated in the core seal installation means 100 by the expedient of readily exchanging one locating plate 104 for another having a larger or smaller circular recess.

Mounted centrally of the base plate 102, is stop means 112, said stop means being threaddedly engaged in the base plate 102 and having a lock nut 114 associated therewith for preventing inadvertent mislocation of the stop means once the stop means has had the stop boss 116 at its upper extremity disposed in the desired location.

Sizing means 120 includes a sizing collar 122 which incorporates a downwardly frusto conical sizing bore 124 adapted to temporarily compress the larger OD of the core seal 20 to ensure that it will be properly received and positioned within the mating mounting ring 30.

It will be noted that core seal expansion means 10 is preferably utilized to expand the core seal after deposition of brazing alloy in the cells 92 of the core seal has been accomplished so that, if any relaxation of the structure of the core seal 20 has occurred because of the impingement on said seal of the heated gasses in which the molten brazing alloy is suspended has occurred, the expansion of the core seal 20 will serve to overcome such undesirable relaxation.

Secured to the underside of the sizing collar 122 is a locating ring 128 which is adapted to encompass the upper extremity of the mounting ring 30 and to properly locate and maintain the sizing collar 122 with reference to the upper extremity of the mounting ring 30.

Operatively engagable with the upper extremity of the core seal 20 is driving means 130 constituted by a circular platen 132 having its perimeter disposed in overlying relationships with the upper extremity of the seal 20 and having drive shaft means 134 associated therewith adapted to drive the core seal 20 downwardly through the frusto conical bore 124 of the sizing collar 122 and into the desired position in the mounting ring 30.

The desired location of the core seal 20 within the mounting ring 30 is accomplished by the impingement of the underside of the drive platen 132 of the drive means 130 upon the stop boss or head 116 at the upper extremity of the stop means 112. As is well known to those skilled in the art, the precise location of the rub surface of the core seal 20 within the mounting ring 30 is of utmost importance because the rub surface must be located precisely within the path of rotation of the turbine blades which it is intended to seal.

Figure 11:
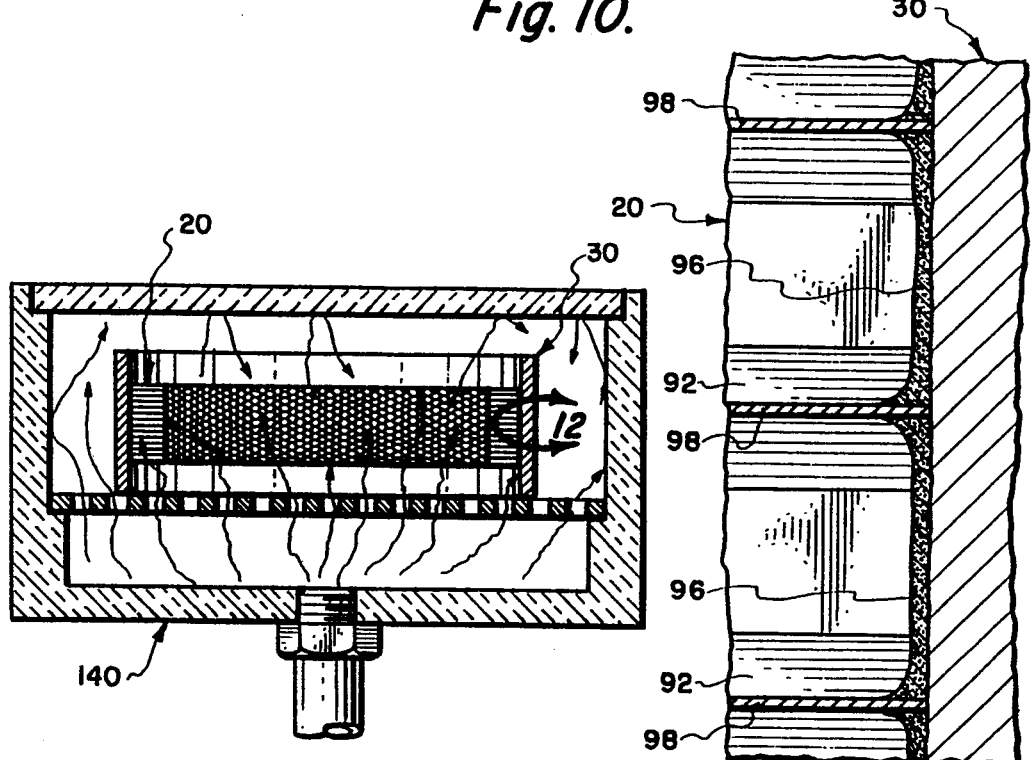
FIG. 11 is a schematic, partly sectional view showing the location of the seal/mounting ring assembly in a brazing furnace.
Figure 12:
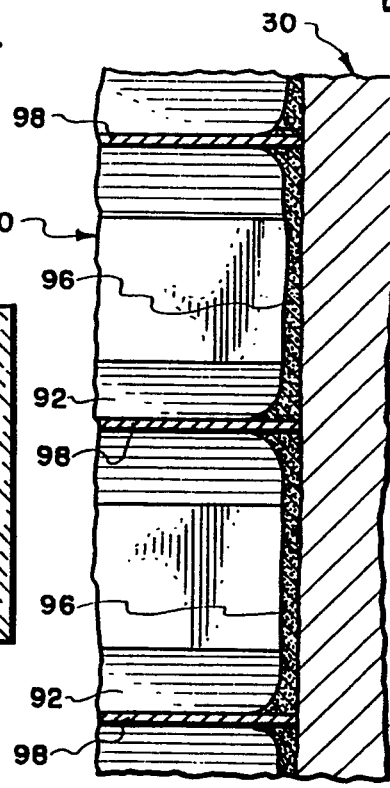
FIG. 12 is a greatly enlarged fragmentary sectional view taken on 12—12 of FIG. 11 showing the manner in which the previously spray deposited brazing alloy is caused to create a substantial interface between the seal and the mounting ring by capillary action.

Schematically shown in FIG. 11 of the drawings is a brazing furnace 140 which receives the core seal mounting ring combination and in which the elevated temperatures to which the said combination is exposed causes the remelting of the alloy and its uniform disposition by capillary action in the manner shown in large fragmentary cross-section of FIG. 12 at 96.

Thus, a securement interface is created between the edges of the cell walls 98 which are juxtaposed to the inner surface of the mounting ring 30. During the brazing process, of course, the compression of the ends of the cells 92 brings said ends of said cell walls 98 into intimate engagement with the inner surface or ID of the mounting ring 30 and thus ensures the securement of the core seal 20 and its desired, optimum location in the mounting ring 30.

Method of the Invention

Honeycomb core seals are available from different manufacturers which manufacture the seals by different processes, but I prefer to utilize, in conjunction with the apparatus and method of my invention, core seals fabricated in accordance with the teachings of my '152 patent.

In the practice of the steps of the method of the invention to achieve the most effective affixation of the OD of the core seal 20 to the ID of the mounting ring 30, the contemplated apparatus actually utilized included components of the nature of those shown in the drawings. All of these components can be utilized in conjunction with hand-actuated shop equipment, such as drill presses and the like. However, it will be understood by those skilled in the art that the steps of the method disclosed and claimed herein can be practiced by integrating the various hand-operated components of the apparatus into a sequentially operated unitary machine.

In the practice of the method, I have found that it is most effective to utilize the applicator means 60 to deposit the brazing alloy in the manner shown in FIGS. 5–8 of the drawings.

The metal spray technique for applying braze alloy to the OD of the core seal preferably utilizes a non-oxidizing vehicle such as hydrogen gas, with the axis of the nozzle 82 being inclined to the OD surface of the seal 20 at the spray zone where the spray impacts with the core seal 20 and is deposited in the cells 92.

The hydrogen gas, being maintained at a temperature above 2000° f., causes the suspended particles of brazing alloy to go into a liquid phase which is subsequently reduced to a solid state by exposure to the cooling gas emitted from the conduit 72 through the frusto conical cooling nozzle 86 and the subsequent exposure of the sprayed cell areas to ambient temperatures.

Many braze alloys experience a phase change when melted and subsequently solidified; this causes a subsequent melt to occur at a higher temperature than the first melt. If the core material and/or mounting ring material requires a maximum braze temperature not to be exceeded, it becomes necessary to use a braze alloy with a lower melting point for metal spray so that the phase change will provide the proper melting point for the braze cycle.

Applying braze alloy to the core by metal spray bonds the alloy uniformly to the core at the braze interface between the core cell edges at the OD of the core seal and the ID of the mounting ring.

Of course, the metal spray nozzle 82 can move parallel to the axes of the platens 62 and 64 in either direction and the rate of travel can be controlled as well as starting and stopping and flow rate of the gas suspended brazing alloy. Moreover, the speed of rotation of the upper and lower platens 62 and 64 can be adjusted so that the rate of deposition of the brazing alloy is subject to further refinement.

As previously pointed out, the spray application of brazing alloy eliminates the damage to the core seal incident to the spike welding method and the significant cost factor arising from the necessity for the out-gassing of the vacuum furnace when brazing alloys incorporated in resinous vehicles are utilized.

Moreover, the uniform application of the brazing alloy arising out of the spray step and the subsequent further refinement of the brazing alloy interface between the OD of the core seal and the ID of the mounting ring are significant advantages. An additional advantage of the spray step is the elimination of the necessity for subsequent machining of the rub surface of the core seal due to damage arising out of the utilization of the spike welding method previously alluded to.

The expansion step of the method involves the utilization of the expansion means 10 shown in FIGS. 1–4 of the drawings wherein the core seal 20 is deposited on the mandrel 12 of the expansion means 10 and driven downwardly thereupon by the expansion head 32. During the expansion process or step, a core seal 20 may be expanded as much as 10% in diameter, but it is contemplated that, with core seals manufactured from different materials or for different mounting ring applications, the expansion of the core seals may be less or greater. Incidentally, it is my preference to expand the core seals after the application of the brazing alloy to the seals because, due to the exposure to the high-temperature spray, relaxation of the structural integrity of the core seal may occur with consequent undesirable side effects. By expanding the core seal after the spray step has occurred, any structural relaxation of the core seal will be eliminated.

Experimentation has shown that expansion of the OD of the core seal to exceed the ID of the mounting ring causes the core seal to be located in said ring under radial compression in a manner to be described in greater detail below.

Consequently, during the brazing cycle, at temperatures up to about 2400° f., the compressive force of the OD of the core seal on the ID of the mounting ring does not diminish to zero, but will maintain the core properly positioned in the ring through the braze cycle.

After the core seal has been expanded to the desired OD, the stripper means 40 can be applied to the lower extremity at the core seal in the manner as shown in FIGS. 4 and 5 of the drawings to cause the displacement of the core seals 20 from the mandrel 12.

The next step of the method includes the utilization of the installation means 100. As previously indicated, the expanded core seal 20 is driven downwardly by the drive platen 132 into the frusto conical bore 124 of the sizing ring 122 to temporarily reduce the expanded core seal 20 to an OD which will be accepted within the ID of the mounting ring 30. After being temporarily compressed, the expanded ring 20 will spring outwardly to compressively urge its OD against the ID of the corresponding mounting ring 30.

The accurate location of the core seal in the mounting ring 30 is achieved by the proper adjustment of the stop head 116 which limits downward movement of the driving platen 132 to ensure that the rub surface of the core seal 20 will be properly located within the mounting ring 30.

The final step of the method includes the brazing cycle which entails the subjection of the core seal and mounting ring combination 20/30 to elevated temperatures to cause a second melt of the brazing alloy. Because of the method of deposition by spray, the brazing alloy, when melted, will spread by capillary action to create a uniform interface 96 with the edges of the walls 98 of the cells 92 of the core seal 20, thus ensuring that the core seal is securely maintained in operative relationship and optimum position within the mounting ring 30.

Therefore, the practice of the method and the utilization of the apparatus of my invention results in the substantial reduction in the cost of mounting core seals in the associated mounting rings because of the elimination of the machining necessary when spike welding takes place and further elimination of out-gassing of the brazing furnace when conventional methods of applying brazing alloy are utilized.

I claim:

1. In an apparatus for mounting a honeycomb core seal having a plurality of cells in a corresponding mounting ring, the combination of: a support for said seal; an applicator of brazing alloy located adjacent the perimeter of said seal for uniformly distributing brazing alloy in said cells at said perimeter; and means for causing relative rotation between said support and said applicator.

2. The apparatus of claim 1 in which said brazing alloy applicator is constituted by a spray nozzle for spraying brazing alloy into said cells.

3. The apparatus of claim 2, including sizing means for sizing said honeycomb seal to cause an interference fit between the OD of said seal and the ID of a mounting ring therefor.

4. The apparatus of claim 1, including means for sizing said honeycomb seal to increase the OD thereof to cause an interference fit between said OD and the ID of a mounting ring therefor.

5. The apparatus of claims 1, 2, 3, or 4, including seal installation means for installing said seal in said mounting ring, said installation means including compression means for momentarily reducing the OD of said seal to install said seal in said ring with an interference fit.

6. The apparatus of claim 5 in which said installation means includes drive means for driving said seal into said ring.

7. The apparatus of claim 1 in which said installation means includes motion limiting means for preventing said drive means from installing said seal in said ring beyond a predetermined location in said ring.

8. The apparatus of claim 1 which includes heat treatment means for causing liquefaction of said brazing alloy at the interface between said seal and said ring.

9. In an apparatus for mounting a cylindrical honeycomb cell seal in a corresponding ring, the combination of: means for expanding said honeycomb seal to impart thereto an OD greater than the ID of said ring; means for depositing brazing alloy in the cells of said seal adjacent the OD of said seal; and heating means for reducing said alloy to a liquid phase to create a bond between the ID of said ring and the OD of said seal.

10. The apparatus of claim 9 in which said means for depositing brazing alloy includes a support for said seal and an applicator for depositing brazing alloy in said cells adjacent the perimeter of said seal.

11. The apparatus of claims 9 or 10 which includes drive means for installing said seal in said ring and sizing means for temporarily reducing the OD of said seal to permit said drive means to install said seal in said ring.

12. The apparatus of claim 11 in which said drive means includes stop means for insuring the proper positioning of said seal within said ring.

13. The apparatus of claim 9 in which said means for depositing brazing alloy includes a rotatable support for said seal and an applicator for said brazing alloy located adjacent the perimeter of said seal for uniformly distributing brazing alloy in the cells of said seal adjacent said perimeter and means for causing relative rotation between said support and said applicator.

* * * * *

UNITED STATES PATENT AND TRADEMARK OFFICE
CERTIFICATE OF CORRECTION

PATENT NO. : 5,348,209
DATED : September 20, 1994
INVENTOR(S) : James R. Campbell It is certified that error appears in the above-indentified patent and that said Letters Patent is hereby corrected as shown below:

In Claim 7, column 10, line 1 of the Patent, delete "1" after "claim" and substitute --5--therefor.

In Claim 8, column 10, line 5, delete "1" after "claim" and substitute --5--therefor.

Signed and Sealed this

Fourth Day of July, 1995

Attest:

BRUCE LEHMAN

Attesting Officer

Commissioner of Patents and Trademarks